United States Patent [19]

Bardo et al.

[11] Patent Number: 4,637,903
[45] Date of Patent: Jan. 20, 1987

[54] LIGHTWEIGHT COOLING TOWER

[75] Inventors: Charles J. Bardo; Jesse Q. Seawell, both of Fort Worth; Anthony J. Dylewski, Arlington; John L. Clark, Jr., Benbrook, all of Tex.

[73] Assignee: Ceramic Cooling Tower Company, Fort Worth, Tex.

[21] Appl. No.: 792,775

[22] Filed: Oct. 30, 1985

[51] Int. Cl.[4] .............................................. B01F 3/04
[52] U.S. Cl. ..................................... 261/24; 52/275; 52/309.1; 261/94; 261/109; 261/111; 261/DIG. 11
[58] Field of Search .................. 261/24, 94, 108–112, 261/DIG. 11, DIG. 77; 52/309.1, 309.2, 275–279; 165/DIG. 1, 900; 220/4 F, 62; 312/31, 31.02

[56] References Cited

U.S. PATENT DOCUMENTS

| | | | |
|---|---|---|---|
| 2,445,908 | 7/1948 | DeFlon et al. | 261/DIG. 11 |
| 3,226,894 | 1/1966 | Burchardt et al. | 261/DIG. 11 |
| 3,648,990 | 3/1972 | Stoker et al. | 261/DIG. 11 |
| 3,739,556 | 6/1973 | Waters | 261/DIG. 11 |
| 3,864,442 | 2/1975 | Percy | 261/DIG. 11 |
| 3,917,757 | 11/1975 | Hoag | 261/92 X |
| 3,917,764 | 11/1975 | Phelps | 261/DIG. 11 |
| 4,382,046 | 5/1983 | Frohwerk | 261/94 |
| 4,416,836 | 11/1983 | Sinek | 261/DIG. 11 |
| 4,422,983 | 12/1983 | Bardo et al. | 261/24 |

Primary Examiner—Richard L. Chiesa

[57] ABSTRACT

A cooling tower is formed from fiberglass reinforced polyester resin structural components including a basin, vertically extending columns, vertical side panels, and a cover. The fill material for heat/mass exchange is supported directly by the basin to eliminate the weight of a separate support system and to reduce the load on the columns and panels. A fan is mounted on the cover, and the weight of the fan is supported by the cover and the columns. The panels do not have to support the weight of the cover and the fan, and the panels can be formed of relatively thin, lightweight material. The columns do not have to support the weight of the fill material and can also be relatively lightweight.

14 Claims, 25 Drawing Figures

LIGHTWEIGHT COOLING TOWER

BACKGROUND

This invention relates to liquid cooling towers, and, more particularly, to a cooling tower whose structural components are formed from lightweight fiberglass reinforced polyester resin.

Cooling towers are used to cool liquid by contact with air. The liquid is allowed to flow downwardly through the tower, and a counter current flow of air is drawn through the falling liquid by various means. A common application of liquid cooling towers is for cooling water (dissipating waste heat) used in electrical generating and process plants and industrial and institutional air conditioning systems.

Most cooling towers include a tower structure which encloses a fill material. The fill material has spaces through which the liquid flows downwardly and the air flows upwardly to provide heat and mass transfer between the liquid and the air. The tower structure may be formed from concrete, metal, or other material.

Metal parts of cooling towers can be corroded by the local atmosphere and/or the liquid which is being cooled. Concrete is very durable, but concrete towers are expensive and heavy. Many cooling towers are located on roofs of buildings, and the weight of a concrete cooling tower can cause building design problems. Co-owned U.S. Pat. No. 4,382,046 refers to a cooling tower with concrete walls which are supported above a concrete water basin by concrete supports.

Plastic parts are resistant to corrosion, but plastic parts ordinarily would not provide enough strength to support the fill material and the weight of the tower itself. One well-known type of fill material which is used by Ceramic Cooling Towers of Fort Worth, Tex. consists of stacked layers of open-celled clay tiles. This fill material can weigh 60,000 to 70,000 pounds for a conventional size air conditioning cooling tower. Structural parts of a cooling tower must not only support the weight of the fill material but must also resist wind forces and should be designed to withstand earthquake loads.

Co-owned U.S. Pat. No. 4,422,983 describes a cooling tower formed from fiberglass reinforced polyester resin panels and beams. All of the structural parts of the tower are fiberglass reinforced polyester resin except the cast iron lintels which are used to support the fill material and stainless steel bolts which connect the fiberglass reinforced polyester resin parts.

Co-owned U.S. patent application Ser. No. 631,591, filed July 17, 1984, now U.S. Pat. No. 4,543,218 describes a cooling tower in which the weight of the tower and the fill material is supported by precast concrete support legs and the basin is concrete. A liquid supply pipe extends vertically upwardly through the fill material and supports the weight of the fan.

It will be appreciated that the use of concrete support legs and a concrete basin decreases the weight which is required to be supported by the fiberglass parts, and these parts can therefore be lighter and can be manufactured more economically. However, the concrete parts increase the total weight of the tower. For many applications, for example roof-mounted towers, it is desirable to use towers of reduced weight.

SUMMARY OF THE INVENTION

The invention provides a lightweight, economical cooling tower in which all of the structural components, namely, the basin, columns, panels, and cover, of the tower are formed from fiberglass reinforced polyester resin. The fill material is supported directly by the basin, and the columns and panels are not required to support any of the weight of the fill material. The fan is mounted on the cover, and the weight of the fan and the cover is supported by the columns. The panels are not required to support the weight of the cover or the fan and can be formed from relatively thin, lightweight material. Each of the columns includes a vertically extending beam portion which provides efficient support for the weight of the fan and the cover, and the columns can also be formed from relatively lightweight material. The panels and columns are advantageously formed from pultruded fiberglass reinforced polyester resin, and the basin and cover can be formed from resin-injected fiberglass reinforced polyester resin.

DESCRIPTION OF THE DRAWING

The invention will be explained in conjunction with an illustrative embodiment shown in the accompanying drawing, in which—

DESCRIPTION OF SPECIFIC EMBODIMENT

Figures 1, 2:
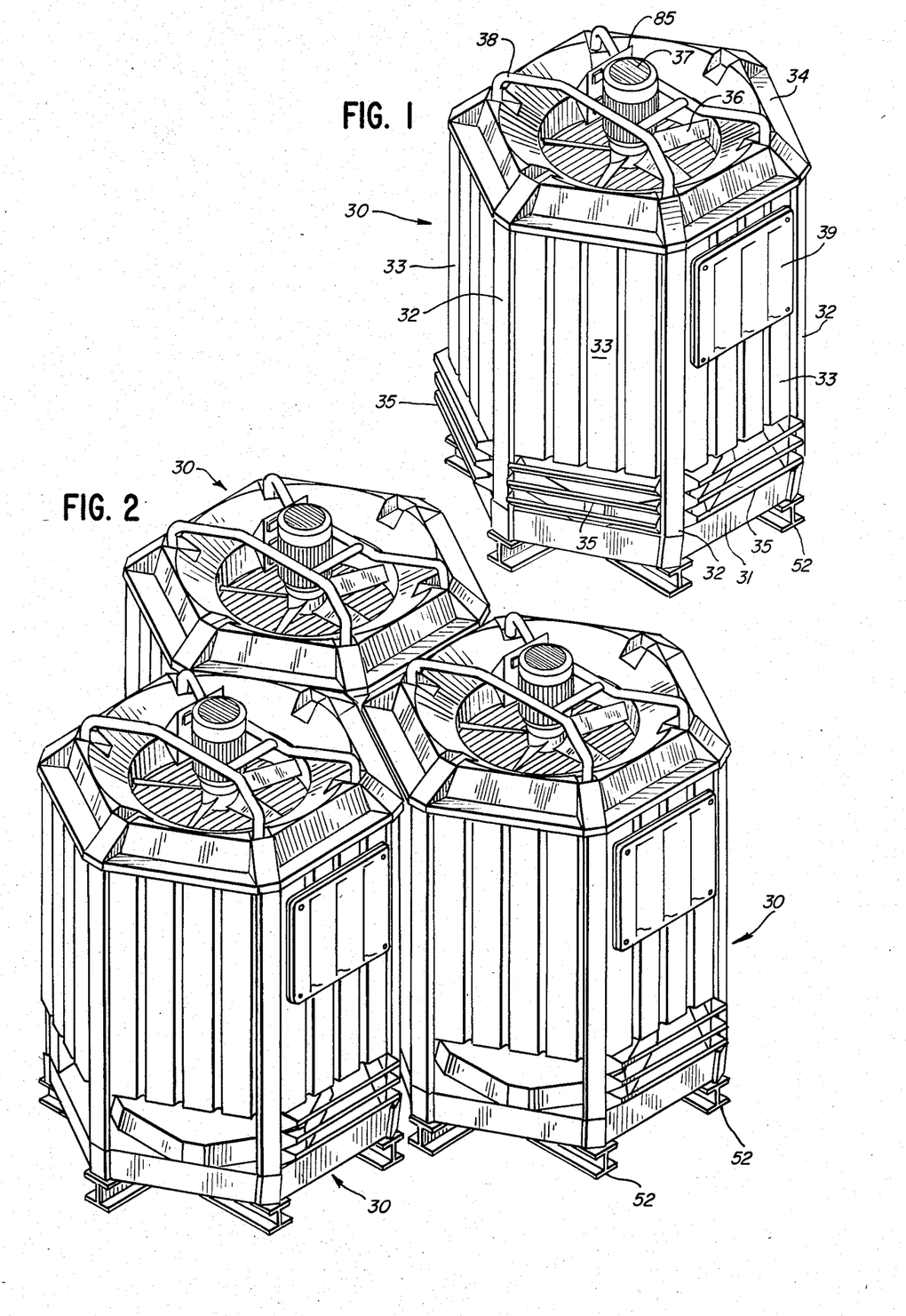
FIG. 1 is a perspective view of a cooling tower formed in accordance with the invention.
FIG. 2 is a perspective view of three cooling towers formed in accordance with the invention.
Figure 3:
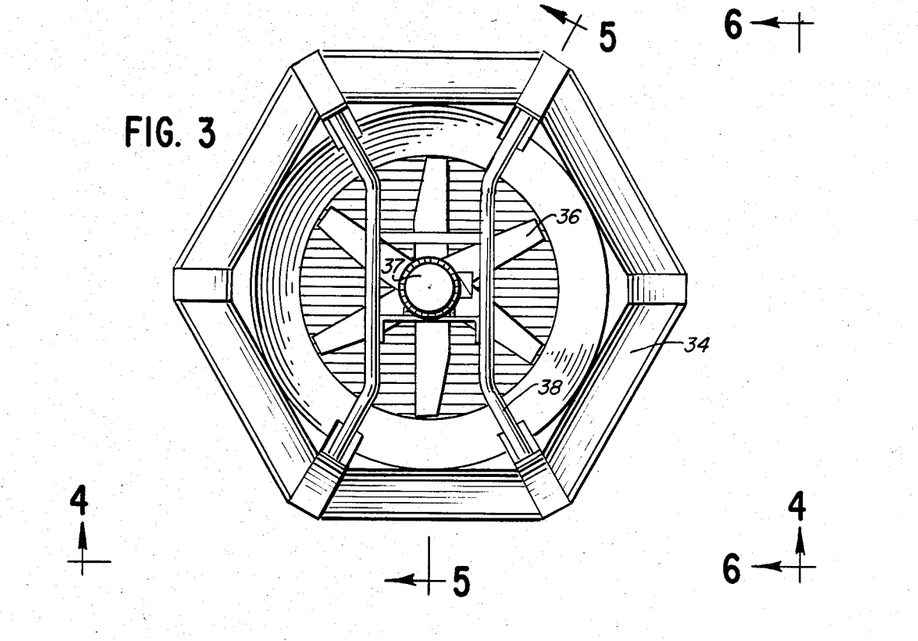
FIG. 3 is a top plan view of the cooling tower of FIG. 1.
Figure 4:
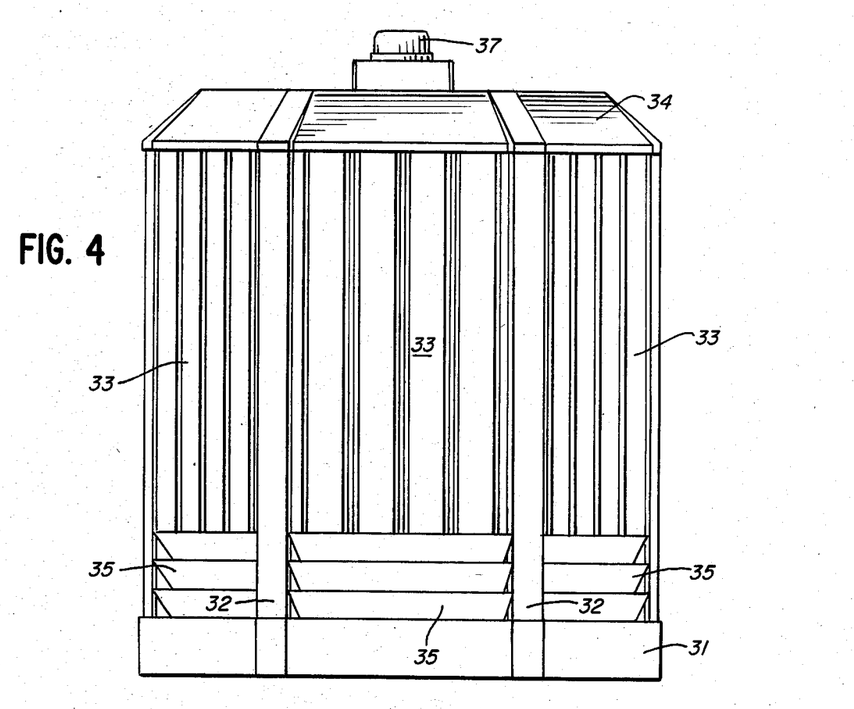
FIG. 4 is a front elevational view of the cooling tower taken along the line 4—4 of FIG. 3.

Referring first to FIG. 1, the numeral 30 designates generally a mechanical draft type of cooling tower which is used for cooling water for an air conditioning system. The cooling tower includes a liquid basin 31 at the bottom of the tower, six vertically extending columns 32, six vertically extending side panels 33 which extend between the columns, and a cover 34. The side panels terminate above the basin, and a louver assembly 35 is attached to the columns below each side panel. A fan 36 is positioned within a fan opening in the cover and is driven by a fan motor 37. The fan and motor are supported by a fan support frame 38 which is mounted on the cover 34. An access panel 29 is removably attached to one of the side panels.

The horizontal cross section of the cooling tower 30 is hexagonal, and FIG. 2 illustrates a cluster of three cooling towers which are nested together to increase the cooling capacity of the system. Additional cooling towers could be added to the cluster if desired.

Referring now to FIGS. 7-11, the basin 31 has an upwardly extending side wall 41, a flat outer bottom wall 42, and a flat central bottom wall 43 which is spaced above the outer bottom wall by an inner wall 44. The side wall 41 is hexagonal in horizontal cross section and has apexes 45 and flat portions 46. The inner wall 44 is also hexagonal, and its apexes 47 are intermediate the apexes 45 of the side wall. Flat portions 48 extend between the apexes.

In the embodiment illustrated the outer bottom wall 42 is supported by a pair of parallel steel I beams 52 and a pair of steel I beams 53 which extend transversely outwardly from the the beams 52. The central bottom wall 43 is supported by a pair of parallel steel I beams 54 which extend transversely across the tops of the lower beams 52 and may be welded thereto.

Figure 5:
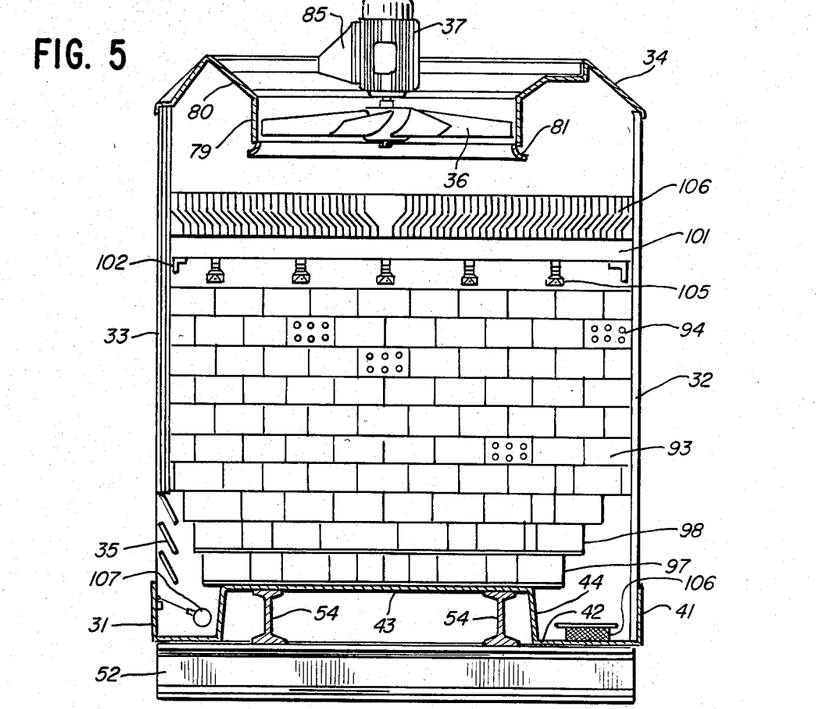
FIG. 5 is a sectional view of the cooling tower taken along the line 5—5 of FIG. 3.
Figure 6:
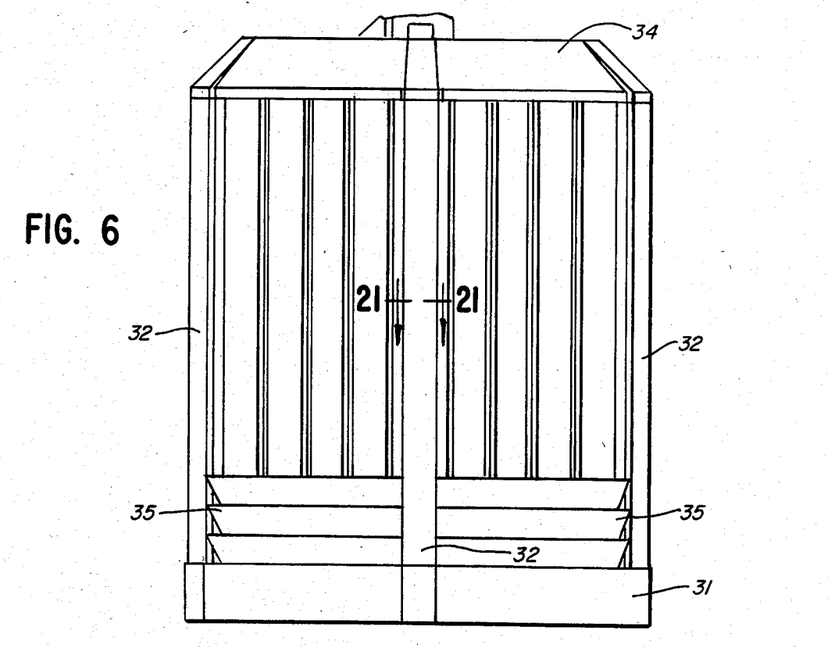
FIG. 6 is an elevational view taken along the line 6—6 of FIG. 3.
Figure 8:
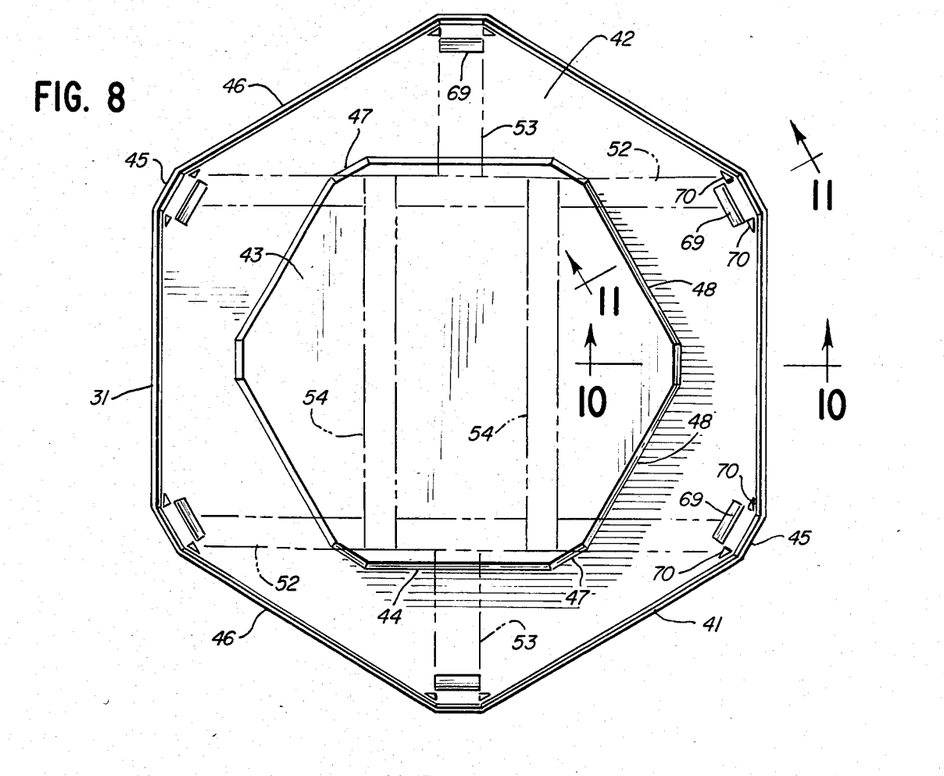
FIG. 8 is a top plan view of the basin of the cooling tower.
Figure 9:
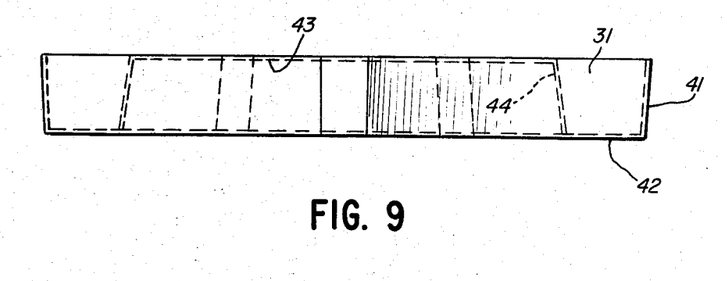
FIG. 9 is a side elevational view of the basin.
Figure 10:
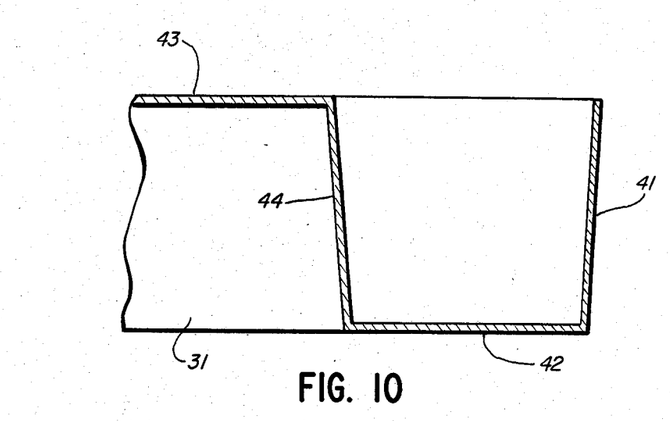
FIG. 10 is an enlarged fragmentary sectional view of the basin taken along the line 10—10 of FIG. 8.
Figure 12:
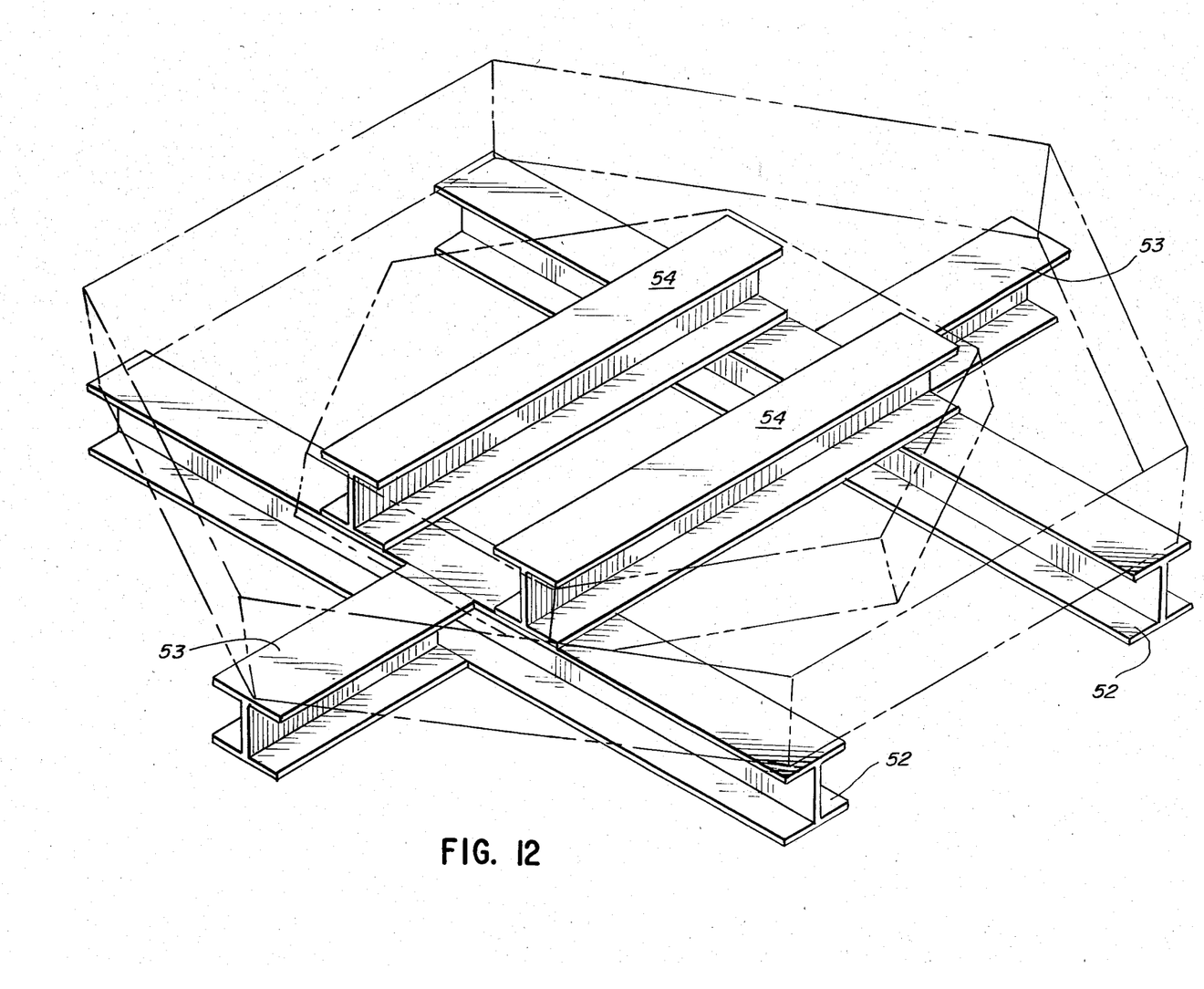
FIG. 12 is a perspective view of the I beam supports for the basin.

As can be seen in FIGS. 8 and 12, the length of the upper I beams 54 is slightly less than the distance between flat portions 48 of the inner wall 44. The height of the upper I beams 54 is the same as the height of the inner wall 44 (FIG. 5). Each of the lower I beams 52 extends between and supports a pair of apexes 45 of the basin and the other two apexes 45 are supported by the lower I beams 53.

Figure 19:
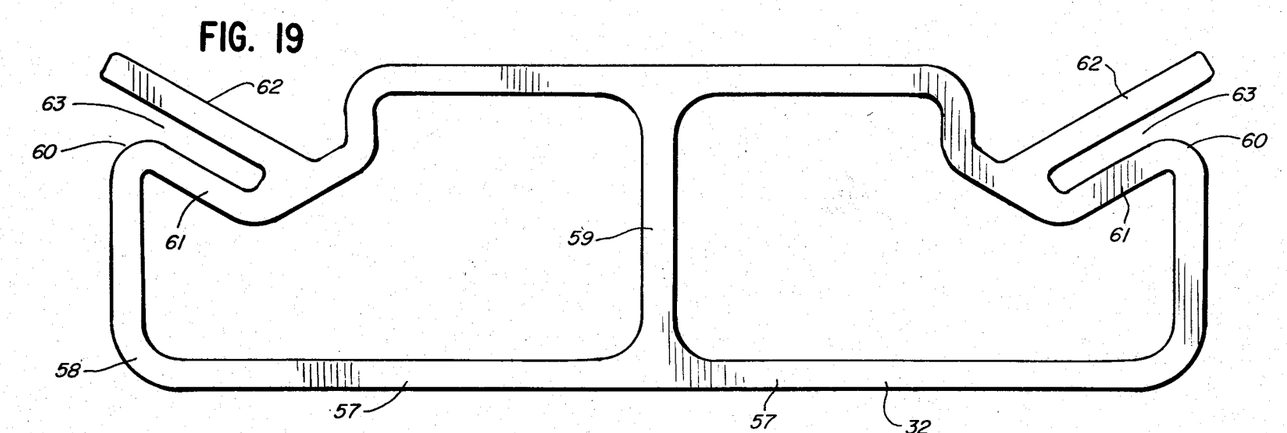
FIG. 19 is a top plan view of one of the columns of the cooling tower.

FIG. 19 is a top plan view of one of the vertical columns 32. Each column 32 includes a pair of vertically extending tubular beam portions 57 which are provided by an outer wall 58 and a partition 59. The beams portions have a relatively high moment of inertia and provide good resistance to deflection under vertical and horizontal loads. Each column includes a pair of panel-attaching portions 60 which are provided by an inwardly extending portion 61 of the outer wall 58 and a web or wall 62 which define a slot 63 which extends vertically for the length of the column. The columns are made from fiberglass reinforced polyester resin and are advantageously pultruded, i.e., formed by pulling the resinous material from a die rather than extruding or pushing the resinous material through the die.

Figures 20, 21:
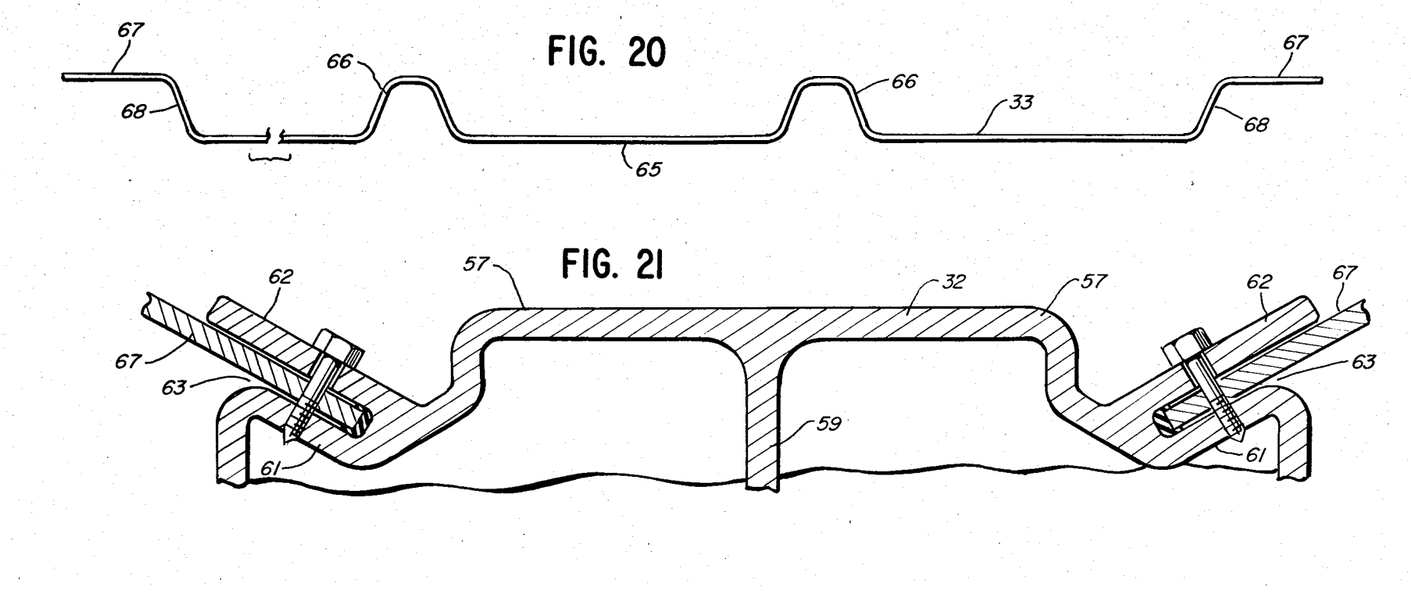
FIG. 20 is a top plan view, partially broken away, of one of the side panels of the cooling tower.
FIG. 21 is an enlarged fragmentary sectional view taken along the line 21—21 of FIG. 6.

FIG. 20 is a top plan view of one of the side panels 33. Each panel includes a generally planar central portion 65 which is provided with a plurality of vertically extending rib portions 66 and a pair of flat edge portions 67 which are offset inwardly from the central portion 65 by shoulders 68. The panels 33 are also formed from pultruded fiberglass reinforced polyester resin.

Figure 11:
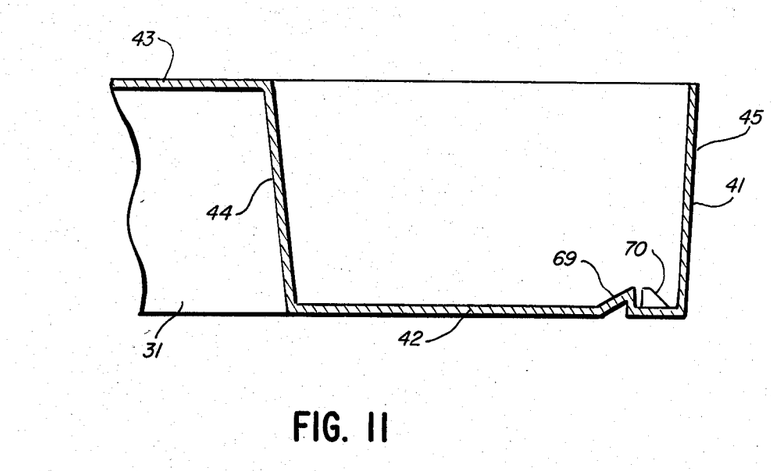
FIG. 11 is an enlarged fragmentary sectional view of the basin taken along the line 11—11 of FIG. 8.

Each of the columns 32 is inserted into one of the apexes 45 of the basin 31. Referring to FIGS. 8 and 11, at each of the apexes of the basin the bottom wall 42 of the basin extends upwardly to form an elongated retaining ridge 69 and a pair of retaining abutments 70. The basin can be molded from resin-injected fiberglass reinforced polyester resin.

The bottom of the column is inserted into the space between the apex 45 and the retainers 69 and 70 and is thereby secured against transverse movement. The column and the outer wall 41 of the basin can be secured together by bolts (not shown).

Referring to FIG. 21, the side panels 31 are attached to the columns by inserting each edge portion 67 into the slot 63 of the associated column. The slots can be filled with a sealing compound 71, e.g., epoxy, before the panels are inserted, and the sealing compound provides a water seal between the panel and the columns. The panels are attached to the columns by bolts 72 which extend through the walls 61 and 62 of the column and the edge portion 67 of the panel. The wall 62 and edge portion 67 are provided with predrilled holes for the bolts, and the bolts are screwed into smaller holes in the wall 61.

Figure 13:
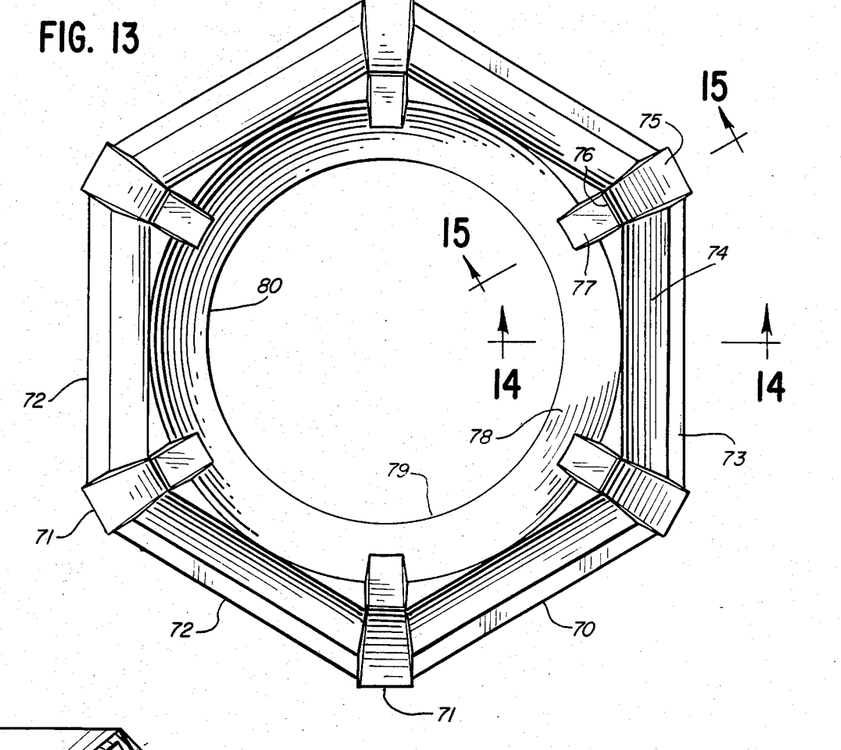
FIG. 13 is a top plan view of the cover of the cooling tower.
Figures 14, 15:
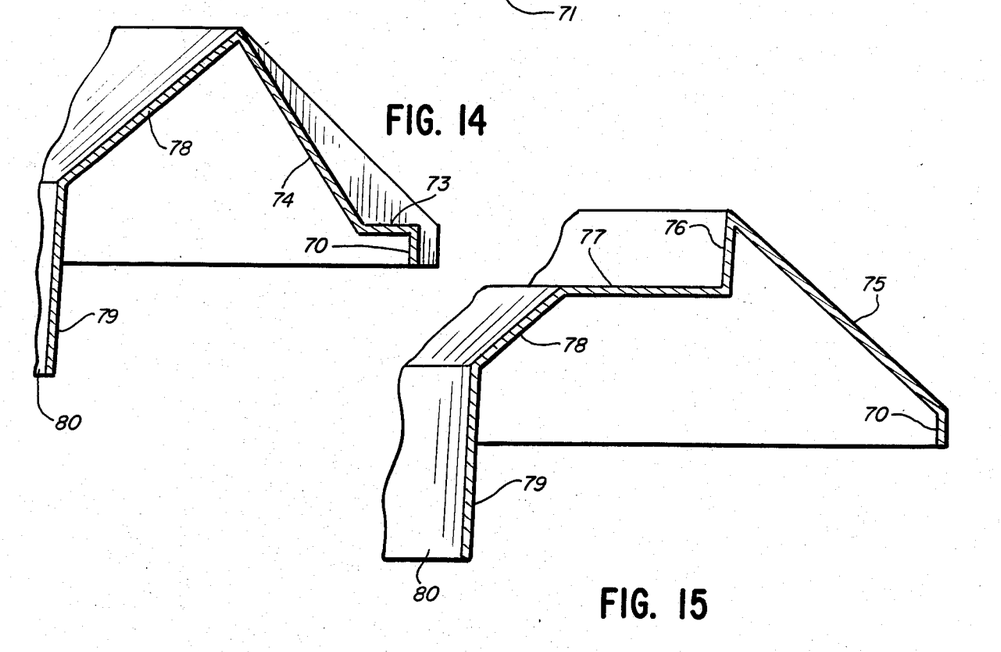
FIG. 14 is an enlarged fragmentary sectional view taken along the line 14—14 of FIG. 13.
FIG. 15 is an enlarged fragmentary sectional view taken along the line 15—15 of FIG. 13.

Referring to FIGS. 13-15, the cover 34 includes a hexagonal side wall 70 which has apexes 71 and straight portions 72. Between the apexes the cover includes a horizontal ledge 73 and an upwardly and inwardly inclined wall 74. At the apexes the cover includes an upwardly and inwardly inclined wall 75, a vertical wall 76, and a horizontal wall 77. A first conical wall 78 merges with the wall 74 and 77, and a second conical wall 79 extends downwardly from the conical wall 78 and provides a fan opening 80. The cover can be formed from resin injected fiberglass reinforced polyester resin.

Figure 16:
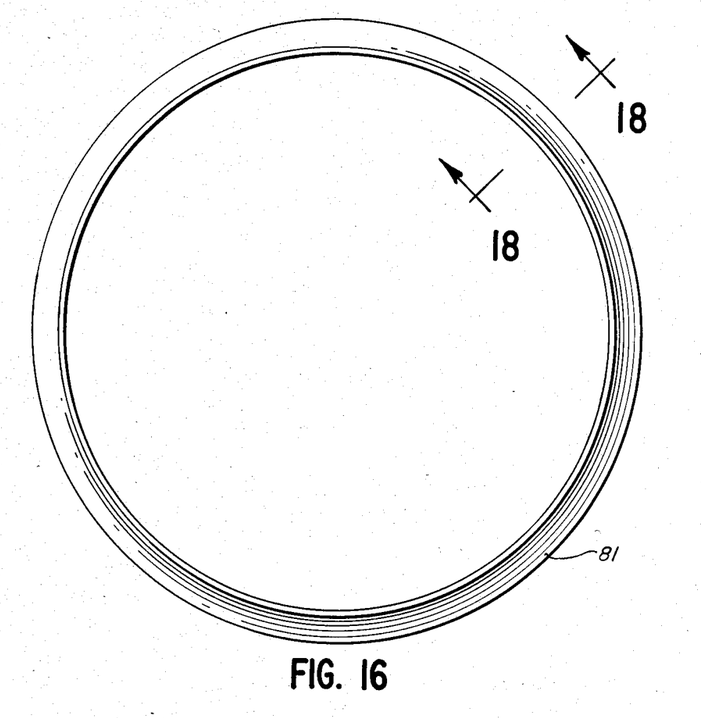
FIG. 16 is a plan view of the cowl of the cover.
Figure 17:
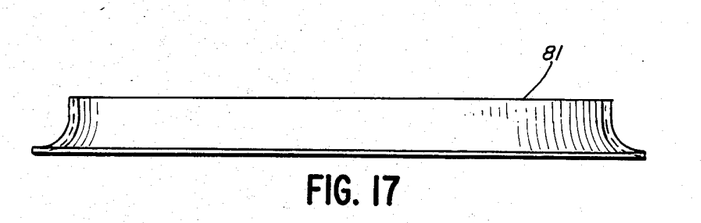
FIG. 17 is a side elevational view of the cowl.
Figure 18:
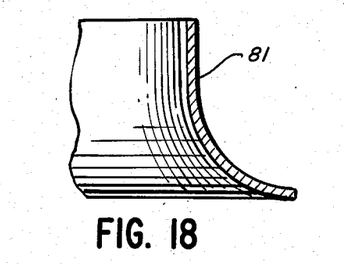
FIG. 18 is an enlarged fragmentary sectional view taken along the line 18—18 of FIG. 16.

A cowl 81 (FIGS. 16-18) is attached to the bottom of the conical wall 79 by cement or the like. The cowl is outwardly flared and provids a smooth transition for air flow from inside the cooling tower through the fan opening.

The cover 34 fits over the columns 32 and panels 33 like a cap on a container. The apexes 71 of the cover fit over and are supported by the columns 32, and the horizontal ledges 73 abut the top edges of the panels 33. The side wall 70 can be attached to the columns and panels by bolts.

Figure 24:
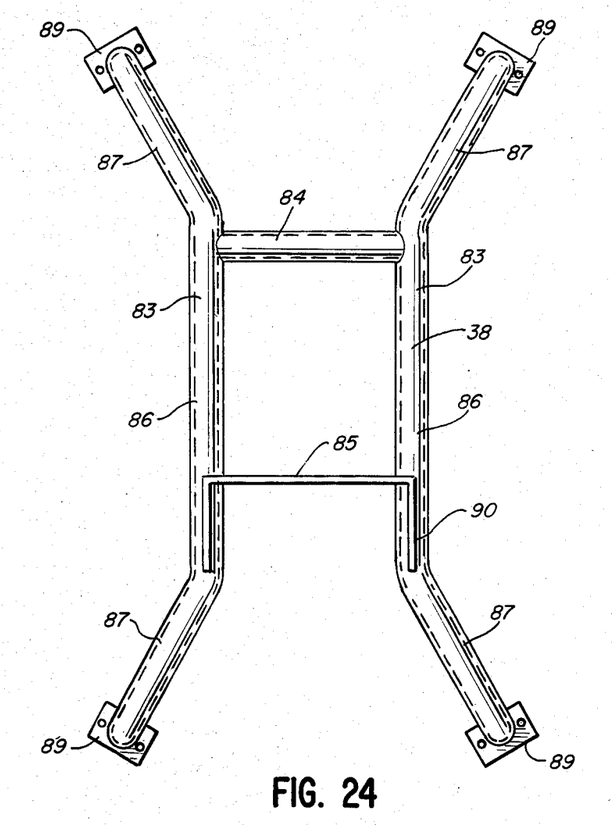
FIG. 24 is a top plan view of the fan support frame.
Figure 25:
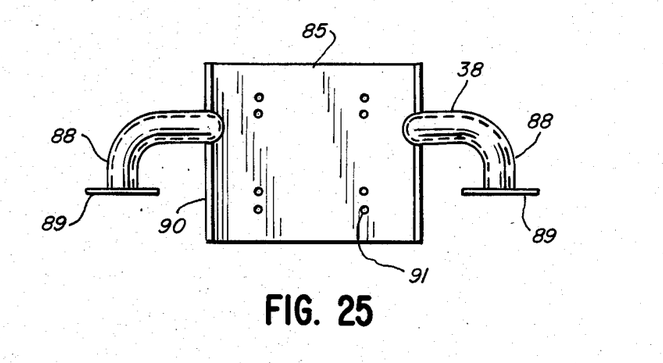
FIG. 25 is a side elevational view of the fan support frame.

Referring to FIGS. 24 and 25, the fan support frame 38 includes a pair of tubes 83, an transverse tube 84, and a motor mounting plate 85. Each of the tubes 83 includes a horizontal central portion 86, a pair of outwardly diverging horizontal portions 87, and a pair of downwardly extending support legs 88. A mounting plate 89 is welded to each of the legs 88.

The motor mounting plate 85 is provided with a pair of semicircular recesses for the tubes 83, and the plate 85 and the transverse tube 84 are welded to the tube 83. The mounting plate 85 includes a pair of side flanges 90 which are aligned with the central portions 86 of the tube 83. The mounting plate 85 is provided with bolt holes 91, and the motor 37 is bolted to the plate.

Each of the four mounting plates 89 is supported by one of the horizontal walls 77 (see FIG. 15) at four of the apexes of the cover 34 and is bolted thereto. The weight of the fan and fan motor is thereby transmitted directly to the four columns 32 which support the four apexes of the cover. These four columns are supported by the lower steel I beams 52. The side panels 33 are not required to support the weight of the fan and the motor, and the side panels only have to support wind load and shear load. The side panels act as shear walls to maintain the columns 32 in a vertical position.

Figure 22:
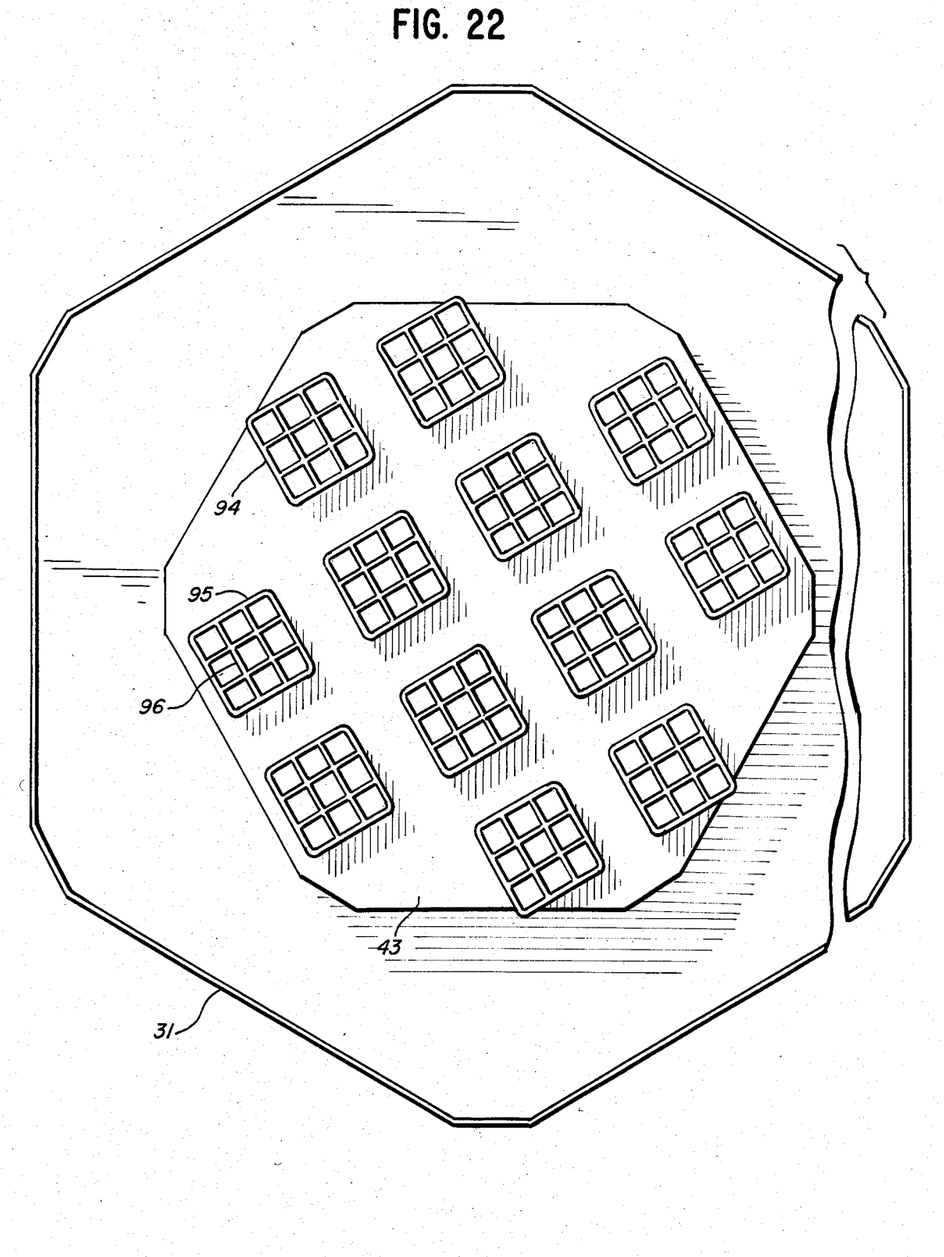
FIG. 22 is a plan view, partially broken away, showing the first layer of fill material on the basin.
Figure 23:
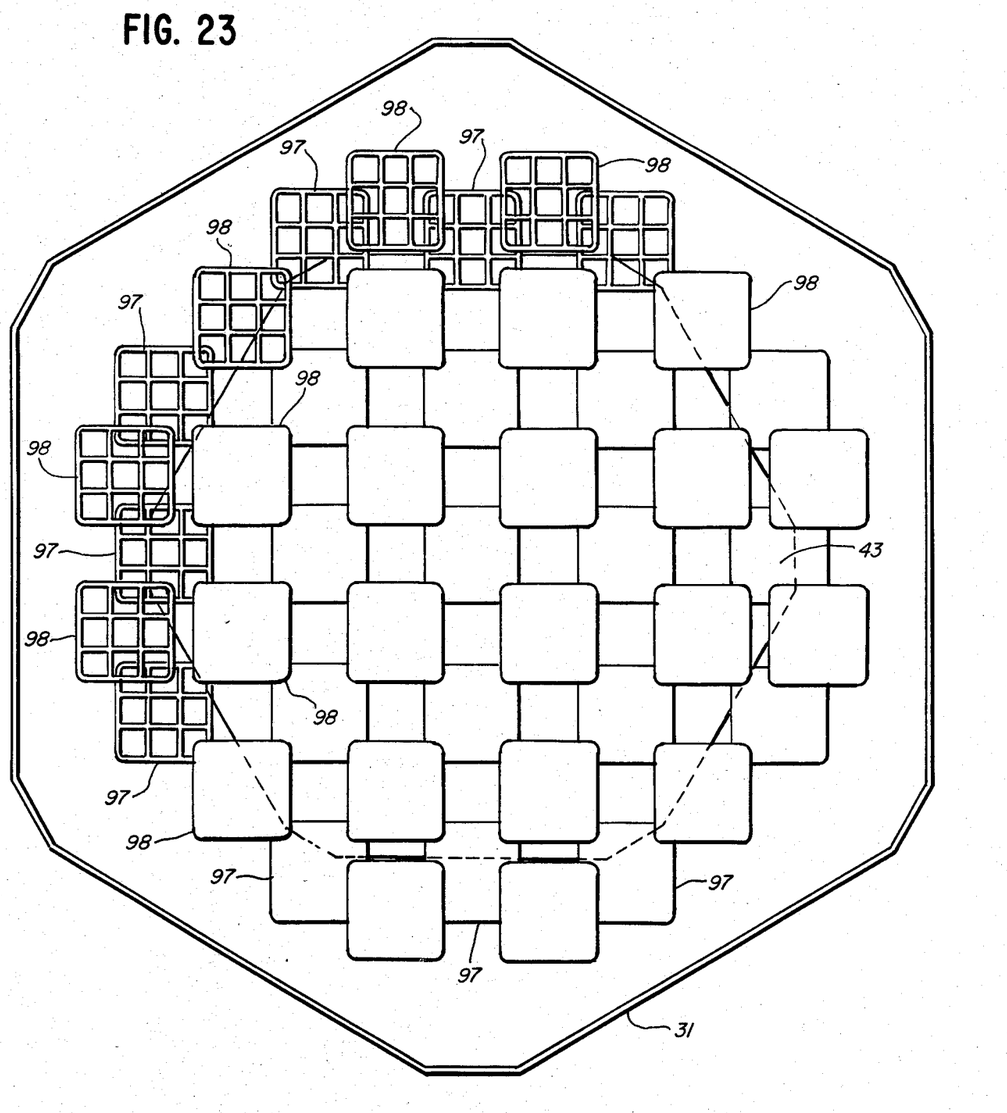
FIG. 23 is a plan view showing additional layers of fill material.

Referring to FIGS. 5, 22, and 23, fill material or heat and mass exchange means 93 is supported directly by the raised central bottom wall 43 of the basin 31. The preferred form of fill material is described in U.S. Pat. No. 4,481,155 and consists of stacked layers of open-celled clay tiles 94. Each tile is generally rectangular in cross section and includes a rectangular side wall 95 and intersecting partitions 96 which define vertically extending cells or open spaces. As described in said patent, the side wall and partitions of each tile is provided with a plurality of openings (see FIG. 5) to permit air and water to flow horizontally through the tile.

FIG. 22 illustrates a portion of the first layer of tiles. The tiles shown in FIG. 22 are completely supported by the raised central bottom wall 43 of the basin. FIG. 23 illustrates the first two layers of tiles. The first layer includes overhanging tiles 97 which are only partially supported by the central bottom wall 43 and extend laterally outwardly from the bottom wall. These overhanging tiles are supported in cantilever fashion by the weight of tiles 98 in the second layer and in succeeding layers. Some of the tiles 98 in the second layer also overhang or extend laterally outwardly beyond the the central bottom wall 43 of the basin, and these tiles are supported by the weight of tiles in succeeding layers (see FIG. 5).

The overhanging tiles position some of the cells of each layer outwardly of the central bottom wall 43 and permit air to flow upwardly through a portion of each layer. The side openings in the tiles permit air to flow horizontally through the tiles and ensure that air will flow upwardly through the central portion of the stacked layers. Accordingly, even though the fill material is supported directly by the basin, efficient air flow is permitted through the fill material.

Since the fill material is supported directly by the basin, support lintels or other support structure for the fill material is eliminated, thereby achieving additional savings in weight and cost. The columns 32 do not have to support the weight of the fill material, and they support only the fan load, wind load, seismic load, and the load of the cover 34. The columns can therefore be made of lightweight, relatively inexpensive material.

Figure 7:
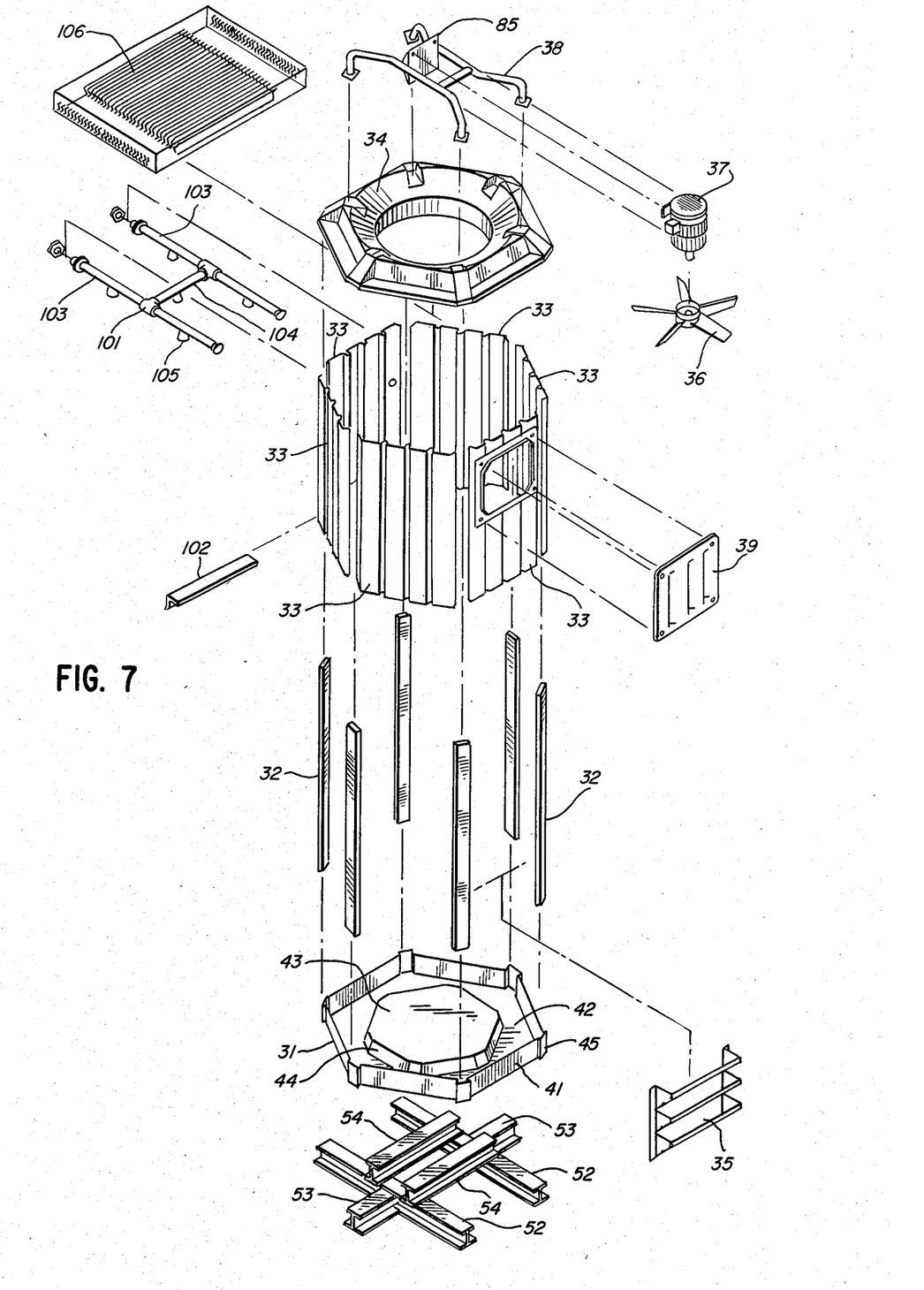
FIG. 7 is an exploded view of the cooling tower.

Referring to FIGS. 5 and 7, a water distribution assembly 101 is supported above the fill material by fiberglass reinforced polyester resin angles 102. Each of the angles 102 is attached to a pair of columns 32. The water distribution assembly includes a pair of parallel water pipes 103, transverse pipe 104, and nozzles 105.

A drift eliminator assembly 106 is supported by the water distribution assembly. In the embodiment illustrated the drift eliminator assembly includes a pair of parallel generally Z-shaped vanes.

The operation of the cooling tower is apparent from the foregoing description and the disclosures of the aforementioned patents. Hot water which is to be cooled is pumped to the water distribution assembly 101 and is sprayed by the nozzles 105 over the fill material. The water flows downwardly through the fill material as the fan 36 draws cooling air from outside of the cooling tower through the louvers 35 and through the fill material. The countercurrent and crosscurrent flow of air and water provide efficient heat/mass exchange between the air and the water. The water collects in the generally annular portion of the basin 31 between the outer side wall 41 and the inner wall 44 and is pumped back to the air conditioning system through a drain 106 (FIG. 5). A float valve 107 may be positioned in the basin to shut off the flow of water to the water distribution system if the basin becomes too full.

The cross sectional configuration of the cooling tower is polygonal. The particular embodiment illustrated has six sides and is hexagonal. However, the cooling tower could be pentagonal or could have more than six sides. A circular cross sectional configuration would provide the greatest amount of area for a given diameter or transverse dimension. However, a cylindrical side wall cannot be pultruded, and the hexagonal configuration is a satisfactory compromise. The hexagonal configuration provides a greater area than a square configuration and provides flat walls which permit a plurality of cooling towers to be nested or clustered as shown in FIG. 2.

While in the foregoing specification a detailed description of a specific embodiment of the invention was set forth for the purpose of illustration, it will be understood that many of details herein given may be varied considerably by those skilled in the art without departing from the spirit and scope of the invention.

I claim:

1. A cooling tower comprising:
   a fiberglass reinforced resin basin,
   porous means for heat/mass exchange which is supported directly by the basin,
   a cover having a fan opening therein,
   a plurality of vertically extending fiberglass reinforced resin columns which extend between the basin and the cover and which are supported by the basin and which support the cover,
   a fiberglass reinforced resin panel extending between each pair of adjacent columns and attached thereto, and
   a fan positioned in the fan opening in the cover and attached to the cover whereby the weight of the fan is supported by the cover and at least some of the columns.

2. The cooling tower of claim 1 including a fan support frame which has a fan support portion to which the fan is attached and a plurality of leg portions, each of the leg portions being attached to the cover adjacent one of the columns.

3. The cooling tower of claim 1 in which the cover is formed from fiberglass reinforced resin.

4. The cooling tower of claim 1 in which the panels are bolted to the columns to maintain the columns in a vertical position.

5. The cooling tower of claim 1 in which the basin includes an outer upwardly extending wall portion, an outer bottom portion which extends inwardly from the wall portion, and a central bottom portion which is spaced upwardly from the outer bottom portion and which supports said porous means for heat/mass exchange.

6. The cooling tower of claim 5 including support means below said central bottom portion of the basin for supporting said central bottom portion and the weight of the heat/mass exchange means.

7. The cooling tower of claim 6 in which said support means includes a pair of metal I beams.

8. The cooling tower of claim 5 including a first pair of spaced-apart horizontally extending support rails below said outer bottom portion of the basin for supporting said outer bottom portion and a second pair of spaced-apart horizontally extending support rails extending transversely above said first pair of rails below said central bottom portion of the basin for supporting said central bottom portion and the weight of the heat/mass exchange means.

9. The cooling tower of claim 5 in which a portion of the heat/mass exchange means extends laterally outwardly from said central bottom portion of the basin and is spaced above said outer bottom portion of the basin whereby cooling air can flow upwardly through said laterally outwardly extending portion of the heat/mass exchange means.

10. The cooling tower of claim 9 in which said heat/mass exchange means comprises a plurality of vertically stacked horizontally extending layers of open-celled tiles, at least some of the layers of tiles including tiles which overhang laterally outwardly from the central bottom portion of the basin, said overhanging tiles being maintained in a horizontal position by the weight of succeeding layers of tiles.

11. The cooling tower of claim 5 in which said heat/mass exchange means comprises a plurality of vertically stacked layers of tiles, each of said tiles having a vertically extending side wall with a plurality of openings therein.

12. The cooling tower of claim 1 in which each of said columns includes a vertically extending beam portion and a pair of panel-attaching portions, each of the panel-attaching portions having a vertically extending slot therein, each of said panels having a pair of vertical edge portions which are inserted into the slots of adjacent columns.

13. The cooling tower of claim 12 including bolts extending through the attaching portions of each column and the panel inserted therein for attaching the panels to the column.

14. The cooling tower of claim 12 including seal material in each of said slots in the columns for providing a seal between the columns and the panels.

* * * * *